United States Patent
Throgmorton et al.

(10) Patent No.: US 11,704,043 B1
(45) Date of Patent: Jul. 18, 2023

(54) BACKUP AND/OR RESTORE AS A SERVICE

(71) Applicant: Salesforce, Inc., San Francisco, CA (US)

(72) Inventors: Andrew Throgmorton, New Haven, CT (US); Christopher Anderson, Jacksonville, OR (US); Cyrille Roy, Laval (FR); Ilan Ginzburg, Plateau des Petites Roches (FR); Jeffrey Allan Miller, Jr., Renton, WA (US); John Martin Buisson, Jr., Missoula, MT (US); Julien Pilourdault, Meylan (FR)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/649,545

(22) Filed: Jan. 31, 2022

(51) Int. Cl.
    G06F 12/00 (2006.01)
    G06F 3/06 (2006.01)

(52) U.S. Cl.
    CPC ............. *G06F 3/065* (2013.01); *G06F 3/067* (2013.01); *G06F 3/0619* (2013.01)

(58) Field of Classification Search
    None
    See application file for complete search history.

(56) References Cited

U.S. PATENT DOCUMENTS

| | | | |
|---|---|---|---|
| 9,632,852 B2 | 4/2017 | Kwong et al. | |
| 10,013,189 B1 * | 7/2018 | Yang | G06F 11/1458 |
| 10,552,464 B2 | 2/2020 | Roustant et al. | |
| 10,762,091 B2 | 9/2020 | Chevalier et al. | |
| 10,768,983 B2 | 9/2020 | Wang et al. | |
| 10,795,662 B2 | 10/2020 | Gadgil et al. | |
| 2018/0060184 A1 * | 3/2018 | Thakkar | G06F 11/1448 |
| 2018/0316552 A1 * | 11/2018 | Subramani Nadar | H04L 41/5045 |
| 2020/0050693 A1 | 2/2020 | Obembe et al. | |
| 2020/0195498 A1 * | 6/2020 | Said | H04L 43/12 |
| 2021/0026561 A1 | 1/2021 | Ginzburg et al. | |
| 2021/0263919 A1 | 8/2021 | Ginzburg | |
| 2021/0326218 A1 * | 10/2021 | Rachapudi | G06F 11/3006 |

* cited by examiner

Primary Examiner — Daniel D Tsui
(74) Attorney, Agent, or Firm — Nicholson, De Vos, Webster & Elliott, LLP (57) ABSTRACT

A service, responsive to a request, determines a scope that includes a specific tenant and a specific component. The service is extensible through addition of different components to manage different data sources used by different services that contribute to a set of one or more multi-tenant cloud services. The service also determines, for the specific component, parameters usable to identify the specific tenant and a specific storage path. Each of the components, responsive to being called to perform a backup or restore with a current set of parameters, is to be implemented to cause data, which belongs to a currently identified tenant, to be copied between the respective one of the data sources and a backup store according to a currently identified storage path. The service also calls the specific component to perform the backup or restore with the parameters.

30 Claims, 5 Drawing Sheets

Determining, based at least in part on a request, a scope that includes at least a specific tenant of a plurality of tenants and a specific component, wherein the first service is extensible through implementation and addition of different components to manage different data sources used by different services that contribute to a set of one or more multi-tenant cloud services, wherein each of the components, including the specific component, is for a respective one of the data sources
130

Determining, for the specific component, a set of one or more parameters usable to identify the specific tenant and a specific storage path particular to a combination including the specific tenant and the respective one of the data sources, wherein each of the components, responsive to being called to perform a specific process type with a current set of parameters usable to identify one of the plurality of tenants as a currently identified tenant and a currently identified storage path, is to be implemented to cause data, which belongs to the currently identified tenant, to be copied between the respective one of the data sources and the backup store according to the currently identified storage path
132

Calling the specific component to perform a specific process type with the set of one or more parameters usable to identify the specific tenant and the specific storage path respectively as the currently identified tenant and the currently identified storage path, wherein the specific process type is one of backup and restore
134

Calling the specific component to perform a dependency check
140

Does the specific component respond to the dependency check representing that the respective one of the data sources is dependent on another respective one of the data sources
142

Determining, for a second specific component that is for the another respective one of the data sources, a second set of one or more parameters usable to identify the specific tenant and a second specific storage path particular to a combination including the specific tenant and the another respective one of the data sources
144

Calling the second specific component to perform the specific process type with the second set of one or more parameters usable to identify the specific tenant and the second specific storage path respectively as the currently identified tenant and the currently identified storage path
146

Determining, for the specific component, a second set of parameters usable to identify a second specific tenant and a second specific storage path particular to a second combination including the second specific tenant and the respective one of the data sources
136

Calling the specific component to perform the specific process type with the second set of one or more parameters that are usable to identify the second specific tenant and the second specific storage path respectively as the currently identified tenant and the currently identified storage path
138

BACKUP AND/OR RESTORE AS A SERVICE

TECHNICAL FIELD

One or more implementations relate to the field of backup and/or restore; and more specifically, to the backup and/or restore of different types of data sources for different services that contribute to a set of one or more cloud services.

BACKGROUND ART

"Cloud" services provide shared resources, software, and information to computers and other electronic devices upon request. In cloud environments, software can be accessible over the internet rather than installed locally on in-house computer systems. Cloud services typically involve on-demand, over-the-internet provision of dynamically scalable and often virtualized resources. Technological details can be abstracted from the users, who no longer need expertise in, or control over, the technology infrastructure "in the cloud" that supports them.

In the context of a cloud service, a data source is a source of data used to provide that cloud service. Typically, the data is stored (and in some cases generated) by an application (e.g., a database, a search platform, etc.). By way of examples, Postgres is a relational database management system (RDBMS), while Solr is an enterprise-search platform that provides full-text search, hit highlighting, faceted search, real-time indexing, dynamic clustering, database integration, NoSQL features, and rich document handling.

One prior art technique for backing up and restoring data sources used to provide a cloud service is to implement, for each of the data sources, separate backup and restore code that handles the backing up and restoring of that data source. By way of example, this has been done for Postgres. Another prior art technique is to use a data source such as Solr that has an internal backup and restore feature.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 1B is a flow diagram illustrating a dynamic backup and/or restore service according to some example implementations.

DETAILED DESCRIPTION

The following description describes implementations for providing backup and/or restore as a service (also referred to herein as a "backup/restore service"). In some implementations, the backup/restore service is invoked through a single, common management process. A data source (existing or new) used by a service (existing or new) can be "plugged in" to the backup/restore service through the addition of a plugin (also referred to as a component) for that data source.

Figure 1A:
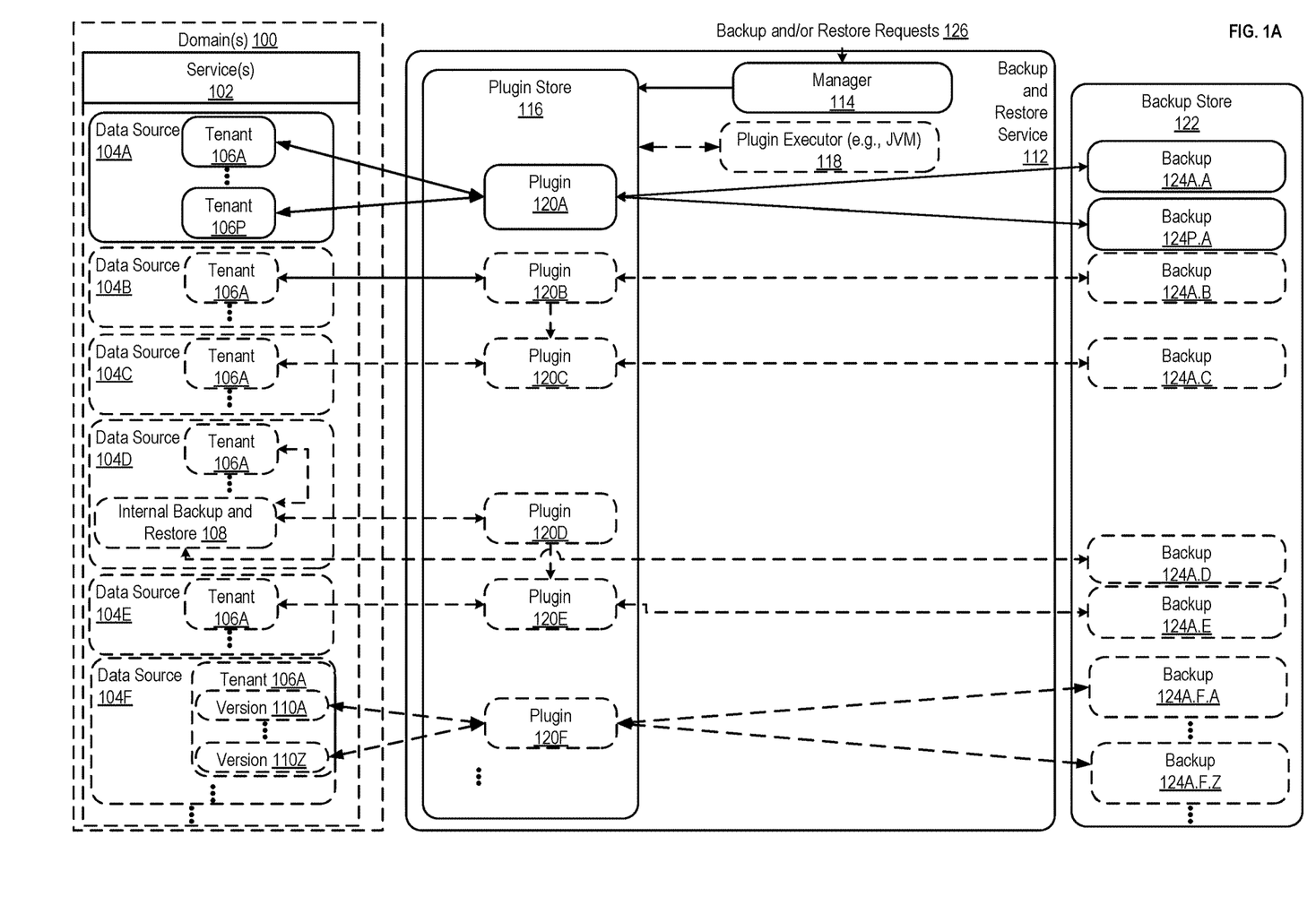
FIG. 1A is a block diagram illustrating a dynamic backup and/or restore service according to some example implementations.

FIG. 1A is a block diagram illustrating a dynamic backup and/or restore service according to some example implementations. FIG. 1A shows: 1) a set of zero or more domain(s) 100 that are optional; 2) a set of one or more service(s) 102 within the domain(s) 100; 3) a set of one or more data source(s) 104A-F within a dashed box connected to the service(s) 102; 4) each of the data source(s) 104A-F has data of an exemplary tenant 106A, and may optionally include data of other tenants; 5) an internal backup and restore 108 feature that is within the data source 104D and that is optional; and 6) several versions 110A-Z of data of the tenant 106A within the data source 104F which is optional. The various optional data sources 104B-F reflect exemplary configurations that are supported by some implementations; alternative implementations may support more, less, and/or different configurations.

FIG. 1A also shows a backup and restore service 112. While a combined backup and restore service is shown, alternative implementations may implement a backup service separate from a restore service. The backup and restore service 112 includes: 1) a manager 114; 2) a plugin store 116; and 3) a plugin executor 118 which is optional.

The manager 114 is to receive backup and/or restore requests 126 on behalf of the backup and restore service 112. In some implementations the backup and/or restore requests 126 are in the form of API (application programming interface) calls. Responsive to each of the backup and/or restore requests 126, the manager 114 controls the flow of execution to perform that request. In some implementations, the manager 114 manages end to end completion of a backup or restore of data for a tenant, ensures only a single backup or restore is happening at once (Locking), handles failures/notifications (e.g., notifying a tenant that a restore has been done, such as for replay).

The plugin store 116 is to store plugins 120. In FIG. 1A, the plugin store 116 is shown storing a plugin 120A, as well as optionally storing plugins 120B-F. Each of the plugins 120 represents code written for a specific one of the data sources 104. Thus, each of the plugins 120 is a separate "component" for a respective one of the data sources 104. In FIG. 1A, data sources 104A-F respectively correspond to plugins 120A-F. While in some implementations the plugins 120 are instances of Java classes and are executed by a Java Virtual Machine (or "JVM") represented by the plugin executor 118, other implementations may use a different mechanism to implement the plugins 120. Thus, a plugin 120 includes backup/restore logic that defines how to do the backup and restore for its data source 104. In some implementations, plugins 120 offer: 1) order control (e.g., restore data to a first data source before another data source); 2) simplified code by forcing all data sets/features to implement their own logic; and 3) expandability (adding new plugins 120 without modifying the entire pipeline).

FIG. 1A also shows a backup store 122 to store backups 124. While in some implementations the backup store 122 is S3 from Amazon, other implementations may use a different storage. For each of the backups 124, there is a storage path usable by the backup store 122 to locate that backup 124 in the backup store 122. Each of the backups 124 is specific to a combination including at least one of the data source(s) 104 and one of the tenants 106. In FIG. 1A, the backups 124 are labeled with letters separated by periods, where the first letter identifies one of the tenants 106, the second letter identifies one of the data source(s) 104, and the third letter (if present) identifies one of the versions 110. For instance, the backup 124A.A is data that belongs to tenant 106A and that is stored in data source 104A; the backup 124P.A is data that belongs to tenant 106P and that is stored in data source 104A; the backup 124A.F.A is data that belongs to tenant 106A, that is stored in data source 104F, and that is version 110A; and the backup 124A.F.Z is data that belongs to tenant 106A, that is stored in data source 104F, and that is version 110Z.

Thus, in some implementations, the backup and restore service 112 is extensible through implementation and addition of different plugins 120/components to manage different data source(s) 104 used by different service(s) 102. Responsive to each of the backup and/or restore requests 126, the manager 114 determines parameters to pass as part of calls to the appropriate plugin(s) 120 to cause the request to be performed; where the parameters are usable by the backup store 122 to identify the storage path(s) to use; and where the called plugin(s) cause the data to be copied between the respective data source(s) 104 and the backup store 122 according to the storage path(s). In this way, the separation between the manager 114 and the plugins 120 as illustrated allows: 1) the manager 114 to provide a single, common interface for the backup and/or restore requests 126, to determine different storage paths for different tenants' 106 data stored in different data sources 104, and to call the appropriate plugins 120; and 2) the use of different plugins 120 to manage how to access the data in different data sources 104. As a result, the coding required to onboard a given data source 104 to the backup and restore service 112 is limited to implementing the plugin 120 (such as the part that can cause the data in the data source 104 to be copied between the data source 104 and the backup store 122). The backup and restore service 112 improves the performance of the electronic device(s) required to implement the service 102 (reduces the power, reduces the storage, reduces the CPU cycles, and/or allows for more data to be backed up) as compared to prior techniques in which separate code, capable of performing the entire backup and restore process, was written for each data source 104.

In FIG. 1A, an arrowed line from one of the plugins 120 to another of the plugins 120 indicates that there is a dependency between those plugins 120. In some implementations, this dependency is used to support scenarios in which a backup 124 of a tenant's 106 data from one data source 104 requires a backup 124 of the tenant's data 106 from another data source 104, and a need for these backups 124 to be consistent (e.g., they reflect a snapshot taken at the same time) and are therefore restorable together. For instance, an arrowed line from plugin 102B to plugin 120C represents a dependency of plugin 120B on plugin 120C, and thus a dependency between a tenant's 106 data from data source 104B on that tenant's 106 data from data source 104C. In some implementations, the manager 114 is responsible for calling the plugin 120C responsive to calling the plugin 120B. Other implementations may additionally or alternatively use a single plugin 120 in place of plugins 120B, 120C. In this case, there is a single plugin 120 for two respective ones of the data sources (e.g., data sources 104B, 104C) that is responsible for causing the backup and/or restore for those data sources 104.

When the manager 114 calls one of the plugins 120A-120F, the manager 114 is to identify: 1) one of the tenants 106 as a currently identified tenant; and 2) a currently identified storage path. Each of the plugins 120 is to be implemented to cause data, which belongs to the currently identified tenant, to be copied between the respective one of the data sources 104 and the backup store 122 according to the currently identified storage path. While the plugins 120A-120C and 120E-120F are each implemented to do the actual copying themselves, the plugin 120D is implemented to cause the internal backup and restore 108 of the data source 104D to copy the data. For example, if the data source 104D is Solr (which has an internal backup and restore process), then the plugin 120D may be implemented to receive from the manager 114 data usable to identify the storage path and trigger the internal backup and restore 108 to copy the data between the data source 104D and the backup store 122 according to that storage path.

By way of a more detailed example, assume the data source 104D is Solr, the data of tenant 106A in Solr is an index, the data source 104E is Postgres storing metadata, and the data of tenant 106A in Postgres pertains to the index. In some implementations, the manager 114 may be implemented to: 1) call the plugin 120D, which may be implemented to cause the internal backup and restore 108 of Solr to copy data between the index (represented by the tenant 106A in the data source 102D) and the backup store 122; and 2) to call the plugin 120E, which may be implemented to copy the metadata (represented by the tenant 106A in the data source 102E) between the data source 102E and the backup store 122. As mentioned above, other implementations may additionally or alternatively use a single plugin 120 in place of plugins 120D-120E, where the single plugin 120 performs the operations of both the plugins 120D and 120E.

As previously described, each of the plugins 120 is to be implemented to cause data, which belongs to the currently identified tenant, to be copied between the respective one of the data sources 104 and the backup store 122 according to the currently identified storage path. In some implementations, this may also include data sources 104 external to one of the service(s) 102. This is represented by the dashed box connected to the service(s) 102 and surrounding the data sources 104 represents. For example, a data source 104 may be a web-based calendar external to, but used by, one of the services(s) 102.

FIG. 1B is a flow diagram illustrating a dynamic backup and/or restore service according to some example implementations. The flow diagram of FIG. 1B will be described with reference to the block diagram of FIG. 1A. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa. In some implementations, FIG. 1B is performed, responsive to receipt of a request, by the manager 114 of the backup and restore service 112.

In block 130, a scope is determined, based at least in part on a request, that includes at least a specific tenant of a plurality of tenants and a specific component. The dynamic backup and/or restore service is extensible through implementation and addition of different components to manage different data sources used by different services that contribute to a set of one or more multi-tenant cloud services. Each of these components, including the specific component, is for a respective one of the data sources. With reference to FIG. 1A: 1) an example of a specific tenant and a specific component would respectively be tenant 106A and plugin 120A; 2) the service would be the backup and restore service 112 that is extensible through the plugin architecture; and 3) the plugin 120A is for the respective one of the data sources illustrated in FIG. 1A as data source 104A. From block 130, control passes to block 132.

In block 132, a set of one or more parameters is determined for the specific component. The set of one or more parameters is usable to identify the specific tenant and a specific storage path particular to a combination including the specific tenant and the respective one of the data sources. Each of the components, responsive to being called to perform a specific process type with a current set of parameters usable to identify one of the plurality of tenants as a currently identified tenant and a currently identified storage path, is to be implemented to cause data, which belongs to the currently identified tenant, to be copied between the respective one of the data sources and the backup store according to the currently identified storage path. Continuing the example using FIG. 1A: 1) the manager 114 determines a set of one or more parameters for plugin 120A; 2) the set of parameters are usable to identify tenant 106A and a specific storage path, where the specific storage path is particular to the combination including tenant 106A and plugin 120A (the storage path is usable by the backup store 122 to determine a location for or of backup 124A.A as compared to the locations of the other backups 124); 3) each of the plugins 120, responsive to being called by the manager 114 with a current set of parameters usable to identify one of the plurality of tenants 106 as a currently identified tenant and a currently identified storage path, is to be implemented to cause data, which belongs to the currently identified one of the tenants 106, to be copied between the respective one of the data sources 104 and the backup store 122 according to the currently identified storage path. From block 132, control passes to block 134.

As shown in block 134, the specific component is called to perform a specific process type with the set of one or more parameters. For this call, the set of input parameters are usable to identify the specific tenant and the specific storage path respectively as the currently identified tenant and the currently identified storage path. The specific process type is one of backup and restore. Continuing the example using FIG. 1A: 1) the manager 114 calls the plugin 120A to perform either a backup or a restore; 2) the set of parameters are usable to identify the tenant 106A and the storage path, where the specific storage path is particular to the combination including tenant 106A and plugin 120A (the storage path is usable by the backup store 122 to determine a location for or of backup 124A.A as compared to the locations of the other backups 124). Thus, in the case of the specific process type being a backup, the manager 114 would call the plugin 120A to back up the data of tenant 106A according to the storage path usable by the backup store 122 to determine the location in which the backup 124A.A is to be stored. In contrast, in the case of the specific process type being a restore, the manager 114 would call the plugin 120A to restore the data of tenant 106A according to the storage path usable by the backup store 122 to determine the location at which the backup 124A.A was stored. From block 134, control passes to optional block 136.

Optional blocks 136-138 represent a flow, according to some implementations, where the same component is used to perform the specific process type on another tenant's data. In block 136, a second set of one or more parameters is determined for the specific component. The second set of one or more parameters is usable to identify a second specific tenant and a second specific storage path particular to a combination including the second specific tenant and the respective one of the data sources. Continuing the example using FIG. 1A: 1) the manager 114 determines a second set of one or more parameters for plugin 120A; and 2) the second set of parameters are usable to identify tenant 106P and a second specific storage path, where the second specific storage path is particular to the combination including tenant 106P and plugin 120A (the storage path is usable by the backup store 122 to determine a location for or of backup 124A.P as compared to the locations of the other backups 124). From block 136, control passes to block 138.

In block 138, the specific component is called to perform the specific process type with the second set of one or more parameters. The second set of input parameters are usable to identify the specific tenant and the specific storage path respectively as the currently identified tenant and the currently identified storage path. Continuing the example using FIG. 1A: 1) the manager 114 calls the plugin 120A to perform either a backup or a restore; 2) the second set of parameters are usable to identify the tenant 106P and the second specific storage path, where the specific storage path is particular to the combination including tenant 106P and plugin 120A (the storage path is usable by the backup store 122 to determine a location for or of backup 124A.P as compared to the locations of the other backups 124). Thus, in the case of the specific process type being a backup, the manager 114 would call the plugin 120A to back up the data of tenant 106P according to the storage path usable by the backup store 122 to determine the location in which the backup 124A.P is to be stored. In contrast, in the case of the specific process type being a restore, the manager 114 would call the plugin 120A to restore the data of tenant 106P according to the storage path usable by the backup store 122 to determine the location at which the backup 124A.P was stored.

Returning to block 132, control can also flow to optional block 140. Optional blocks 140-146 represent a flow, according to some implementations, where the specific component is dependent upon another component, and thus the respective one of the data sources is dependent upon another respective one of the data sources. For this, a second example using FIG. 1A will be used. Specifically, for blocks 130-134, assume that the manager 114 called the plugin 120B to perform the specific process type on the data of tenant 106A in data source 104B according to a storage path usable by the backup store 122 to identify backup 124A.B.

In block 140, the specific component is called to perform a dependency check. Continuing the second example using FIG. 1A: 1) the manager 114 calls the plugin 120B to perform a dependency check. As shown in FIG. 1A, plugin 120B is dependent upon plugin 120C, and thus the data source 104B is dependent upon the data source 104C. Responsive to this call the manager 114 will receive a response. From block 140, control passes to block 142.

In block 142, it is determined whether the specific component responds to the dependency check representing that the respective one of the data sources is dependent on another respective one of the data sources. If yes, control passes to block 144; otherwise, control passes to optional block 136. Continuing the second example using FIG. 1A, the manager 114 would receive a response representing that the plugin 120B is dependent upon plugin 120C, and thus that the data source 104B is dependent upon the data source 104C.

In block 144, a second set of one or more parameters is determined for a second specific component. The second set of parameters is usable to identify the specific tenant and a second specific storage path particular to a combination including the specific tenant and the another respective one of the data sources. Continuing the second example using FIG. 1A, the manager 114 would determine, for the plugin 120C, a second set of parameters usable to identify the tenant 106A and a second storage path, where the second specific storage path is particular to the combination including tenant 106A and plugin 120C (the storage path is usable by the backup store 122 to determine a location for or of backup 124A.C as compared to the locations of the other backups 124). From block 144, control passes to block 146.

In block 146, the second specific component is called to perform the specific process type with the second set of one or more parameters usable to identify the specific tenant and the second specific storage path respectively as the currently identified tenant and the currently identified storage path. Continuing the second example using FIG. 1A, the manager 114 would call the plugin 120C with the second set of parameters usable to identify the tenant 106A and a second storage path, where the second specific storage path is particular to the combination including tenant 106A and plugin 120C (the storage path is usable by the backup store 122 to determine a location for or of backup 124A.C as compared to the locations of the other backups 124). From block 144, control passes to optional block 136. While an example of one dependency and one level has been shown, there may be additional dependencies in the form of: 1) the dependency check returning more than one dependency and the manager being implemented to call each dependent plugin (where each is at the same level); and/or 2) recursion (e.g., a first plugin on a second plugin, the second plugin on the first plugin, etc.) such that there are multiple levels of dependencies.

While some implementations perform a separate call to the specific component for the dependency check, alternative implementations may be implemented differently. For example, see the above discussion regarding using a single plugin. As another example, some implementations could have a data structure identifying the dependencies that the manager 114 accesses to determine the dependencies between the plugin(s) 120 (rather than calling the plugins). One advantage to the manager 114 calling a plugin 120 for a dependency check is that the writer of the plugin 120 is expected to be familiar with the respective one of the data sources 104 for that plugin 120 (as compared to the writer of the manager 114).

Different implementations may be implemented to perform a dependency check before block 134, after block 134, or both. In other words, the manager 114 may be implemented to: 1) call the specific component to perform a dependency check with the set of one or more parameters before the calling to perform the specific process type; and 2) call the specific component to perform a dependency check with the set of one or more parameters after the calling to perform the specific process type. One advantage to doing both is that it may be better to perform a backup or a restore on one of the two data sources 104 before the other (e.g., if one of the data sources is large, if one of the data sources is more likely to change—such as backing up a metadata data source before backing up a Solr data source), and doing both puts the choice of before or after in the hands of the writer of the plugin 120 that is expected to be familiar with the respective one of the data sources 104 for that plugin 120 (as compared to the writer of the manager 114).

Like the above discussion regarding dependency checks (e.g., performing one before block 134, after block 134, or both), some implementations additionally or alternatively perform integrity checks. In other words, the manager 114 may be implemented to: 1) call the specific component to perform an integrity check with the set of one or more parameters before the calling to perform the specific process type; and 2) call the specific component to perform an integrity check with the set of one or more parameters after the calling to perform the specific process type.

Examples of the type of integrity check(s) to perform before a backup in block 134 include checks that involve decisions whether a backup can and/or should be done. For example, such checks may include: 1) can the plugin 120 establish communication with the data source; 2) can the plugin 120 establish communication with the backup store 122; 3) was a backup done too recently to justify doing another backup now; 4) was the data changed since the last backup; etc. If a decision is made that a backup cannot or should not be done, the plugin 120 would respond with an indication that a backup should not be done; in response, the manager 114 would skip block 134 (as well as potentially take some other action, such as providing a notification). Examples of the type of integrity check(s) to perform after a backup in block 134 include checks that involve decisions whether the backup was successful. For example, such checks may include: 1) a check whether there is data at the storage path in the backup store 122; 2) does the backed-up data look correct; 3) is the backed-up data in the correct format; etc.

Examples of the type of integrity check(s) to perform before a restore in block 134 include checks that involve decisions whether a restore can and/or should be done. For example, such checks may include: 1) can the plugin establish communication with the data source; 2) can the plugin establish communication with the backup store 122; 3) was a restore done too recently to justify doing another restore now; 4) was the data changed since the last restore; etc. If a decision is made that a restore cannot or should not be done, the plugin 120 would respond with an indication that a response should not be done; in response, the manager 114 would skip block 134 (as well as potentially take some other action, such as providing a notification). Examples of the type of integrity check(s) to perform after a restore in block 134 include checks that involve decisions whether the restore was successful. For example, such checks may include: 1) a check whether there is data for the tenant 106 in the data source 104; 2) does the restored data look correct; 3) is the restored data in the correct format; etc. Different implementations may take different actions based on whether this post-integrity check is passed (e.g., undoing any backup or restore operations that had been performed by that plugin 120, as well any plugins 120 that depend on that plugin 120).

Similarly, while some implementations perform a separate call to the specific component for the integrity check, alternative implementations may be implemented differently. For example, see the above discussion regarding using a single plugin.

As previously described, a data source may have an internal backup and restore feature and be dependent on another data source. For this, a third example using FIG. 1A will be used. Specifically, for blocks 130-134, assume that the manager 114 calls the plugin 120D to perform the specific process type on the data of tenant 106A in data source 104D according to a storage path usable by the backup store 122 to identify backup 124A.D. In this case, the plugin 120D invokes the internal backup and restore 108 with the storage path to perform the specific process type.

Thus, the specific component (e.g., plugin 120D) is to be implemented to cause an internal backup and restore service of the respective one of the data sources to copy the data, which belongs to the currently identified tenant, between the respective one of the data sources and the backup store according to the currently identified storage path. Also in this third example, for block 140-146, assume that responsive to the dependency, the manager 114 calls the plugin 120E to perform the specific process type on the data of tenant 106A in data source 104E according to a storage path usable by the backup store 122 to identify backup 124A.E. In this case, the specific component (e.g., plugin 120E) is to be implemented to access the data, which belongs to the currently identified tenant, to be copied between the respective one of the data sources and the backup store according to the currently identified storage path. This third example could apply, for example, where the data source 104D is Solr, the data of tenant 106A is an index in Solr, the data source 104E is Postgres, and the data of tenant 106A is a metadata regarding that index.

As previously described, the data of the tenant in a data source may include multiple versions (e.g., a tenant can have a version A of an index that includes features X and Y. Assume that the tenant wants to enable a new feature Z that requires a different model of indexing data that is not compatible with the features X and Y. The index may be rebuilt—e.g., using a reindex function—as a new index that is version B and that has feature Z enabled. Thus, two different versions A, B of the index may exist side-by-side.). For this, a fourth example using FIG. 1A will be used. Specifically, for blocks 130-134, assume that the manager 114 called the plugin 120F to perform the specific process type on the version 110A in the data of tenant 106A in data source 104F according to a storage path usable by the backup store 122 to identify backup 124A.F.A. In such a case, the set of parameters passed when the manager 114 calls the plugin 120F would additionally include the version ID of the version 110A in some implementations. Thus, separate calls would be made by the manager 114 to plugin 120F for each of the versions 110A-Z, and as a result separate backups 124A.F.B-124A.F.Z would be used. In terms of FIG. 1B, the respective one of the data sources for the specific component is to store a plurality of versions of the data for the specific tenant, the scope also includes a specific version of the plurality of versions, and the combination also includes the specific version. While in some implementations the version to operate on would be identified in the backup and/or restore request 126, alternative implementations may use a different technique (e.g., have a data structure that stores the versions IDs of the versions and that is accessed by the manager 114). Additionally or alternatively, while some implementations make separate calls to the plugin for each version, alternative implementations may implement the plugin to do all the versions for a tenant in a data source responsive to a single call. In which case, the plugin would have stored in it or have access to (e.g., by accessing the data source, via a separate data structure, etc.) the version IDs.

In some implementations, for those of the plugins 120 implemented to copy the data between the respective one of the data sources and the backup store 122 (e.g., plugins 120A-C and E-F), the plugin: 1) includes code that can access the respective one of the data sources; and 2) includes code that makes use of an object passed as one of the parameters by the manager 114. This object is typically written by the writer of the manager 114 and handles the copying of data to and from the backup store 122. As a result, the writer of the plugin need not write this object or code to interface with the backup store 122, just to write code to use the object. This has the same advantages described above regarding having the person expected to be the most familiar with the task be the writer of the code (the writer of the plugin being familiar with the data source vs the writer of the manager 114 being familiar with the backup and restore service 112).

As previously discussed, each of the data sources 104 is used in providing a service of service(s) 102. Also, more than one of data sources 104 may be used in providing a single one of the services 102. For example, data sources 104B and 104C may be used in providing a single one of the service(s) 102. In such a case relative to FIGS. 1A and 1B, the specific component, its respective one of the data sources 104, the second specific component, and its respective one of the data sources 104 are used by a single one of the services that contribute to the set of one or more multi-tenant cloud services.

In some implementations, the domain(s) 100 are not used and each of the service(s) 102 represents a different multi-tenant cloud service, and thus contributes to that multi-tenant cloud service. In other implementations, each of the set of one or more domains(s) 100 represents a different multi-tenant cloud service, with each of the service(s) 102 contributing to one of the multi-tenant cloud service(s). In some such implementations, a micro-service architecture may be used in which there are one or more groups of the service(s) 102, each of the service(s) 102 is a micro-service, and those of the service(s) 102 within a group collectively contribute to providing one of the multi-tenant cloud service(s) (also referred to as applications). Also, in some such implementations, the storage paths used for each domain are also specific to that domain to keep the backups for the different domains separate. With reference to FIG. 1B, this means the following in some implementations: 1) the scope also includes a specific domain of a plurality of domains; 2) each of the plurality of domains hosts a respective one of the set of one or more multi-tenant cloud services, hosts the one or more of the services that contribute to the respective one of the set of one or more multi-tenant cloud services, and hosts the one or more of the data sources used by the one or more of the services that contribute to the respective one of the set of one or more multi-tenant cloud services; and 3) the combination also includes the specific domain. While in some implementations the domain to operate on would be identified in the backup and/or restore request 126, alternative implementations may use a different technique (e.g., have a data structure that stores domain IDs and that is accessed by the manager 114).

Turning now to the storage paths and the backup store 122, in some implementations there is metadata regarding the backups inherent in the storage path used in the backup store. In some implementations that support both domains and versions, the storage paths are: 1) Domain\Tenant\Backup ID\Data Source (e.g., Plugin ID); or 2) Domain\Tenant\Backup ID\Data Source (e.g., Plugin ID) \Version ID. In some such implementations, the domain, tenant, and version ID (if used) are provided in the backup and/or restore requests 126, while the backup ID (e.g., a time stamp) is provided by the manager 114 to link the backups 124 taken at the same time together. Alternative implementations may support: 1) more, less, and/or levels in the storage path(s) (e.g., an implementation that does not support Domains may have Tenant\Backup ID\Data Source (e.g., Plugin ID)); and/or 2) more or less storage paths (e.g., an implementation that does not support Versions may have just Domain\Tenant\Backup ID\Data Source (e.g., Plugin ID)). Also, different implementations may implement the storage path differently (e.g., a directory path for a file system, key value pairs for Amazon's S3, etc.).

Figure 1C:
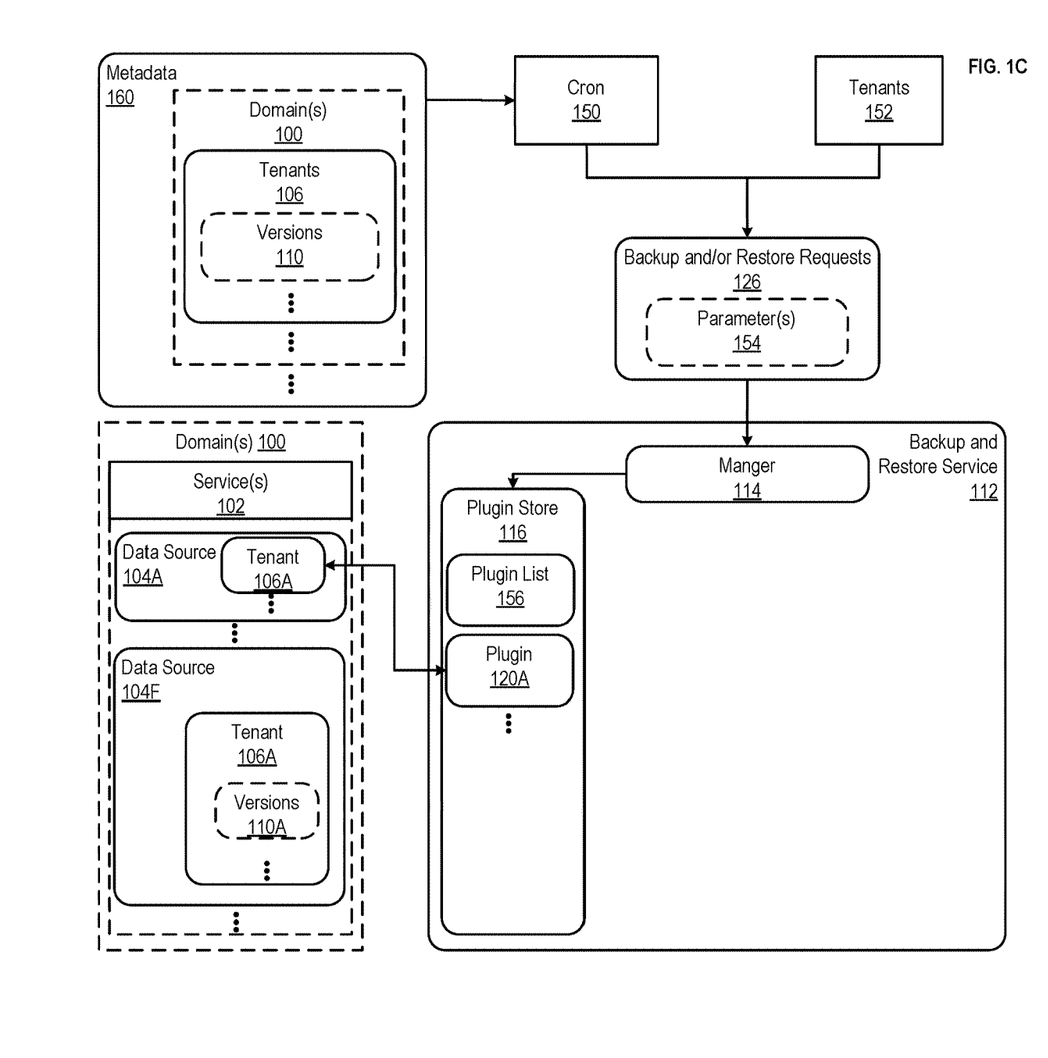
FIG. 1C is a block diagram illustrating a cron and/or tenant initiated backup and/or restore request to the dynamic backup and/or restore service according to some example implementations.

FIG. 1C is a block diagram illustrating a cron and/or tenant initiated backup and/or restore request to the dynamic backup and/or restore service according to some example implementations. FIG. 1C shows several items from FIG. 1A, including: 1) domain(s) 100; 2) service(s) 102; 3) data sources 104A and E; 4) tenant 106A; 5) versions 110A; 6) backup and/or restore requests 126; 7) backup and restore service 112; 8) manager 114; 9) plugin store 116; and 10) plugin 120A. FIG. 1C additionally shows a cron 150 and/or tenants 152 may submit backup and/or restore requests 126. A cron is a job scheduler that runs jobs periodically (e.g., a fixed times, dates, or intervals). The cron 150 accesses metadata 160, which includes metadata regarding domains 100 (if used), tenants 106, and versions 110 (if used). The cron 150 uses the metadata 160 to generate parameter(s) 154 in the backup and/or restore requests 126. For instance, the cron 150 may loop through the metadata 160 to generate the needed backup requests 126 to periodically backup the date of tenants 106 in the data sources 104. Similarly, a tenant 152 (which would be one of the tenants 106) may populate parameter(s) 154 in the backup and/or restore requests 126. In FIG. 1C, the plugin store includes one or more data structures to indicate which plugins should be called for which domains.

In some implementations the API of the manager 114 includes support for backup and restore requests 126 with the following parameter(s) 154: 1) domain (if used) and tenant; 2) Domain (if used), Tenant, and Version ID (if used); 3) Domain (if used), Tenant and Data Source (e.g., Plugin ID); 4) Domain (if used), Tenant, Data Source (e.g., Plugin ID), and Version ID (if used). Cron 150 typically submits backup requests with a domain (if used), tenant, and version ID combination as parameters 154. Tenants typically submit restore requests with a Domain and Tenant as parameters. Alternative implementations support more, less, and/or parameters.

In some implementations, the parameter(s) 154 identify the level of the storage path at which the backup or restore is requested. For instance, where the parameters 154 include domain and tenant, the level of the storage path indicated in the request is domain\tenant. In which case, the manager 114 will call the plugins 120 for that tenant for that domain based on the plugins 120 identified by the plugin list 156 for that domain. As another example, where the parameters 154 include domain, tenant, and data source (e.g., plugin ID), the level of the storage path indicated in the request is domain\tenant\data source. In which case, the manager 114 will call the plugin for that tenant's data in that data source of that domain.

The cron 150 typically submits backup requests with a Domain, Tenant, and Version ID combination as the parameters. Tenants typically submit restore requests with a Domain and Tenant as parameters. Alternative implementations may support more, less, and/or different levels.

While some implementations used a plugin list 156, alternative implementations may additionally or alternatively include a plugin (per domain if used) called "All" that has a dependency on every plugin (for that domain if used).

As previously described, the backup IDs may be time stamps. If so, the timestamps must be managed to keep backups up to date. In some implementations this is done by looping all backups/plugins and triggering backups when they are stale, while other implementations use other techniques (e.g., Relational Database Service (RDS)). In some implementations, RDS requires another data structure be managed and many API calls to the backup store 122 (which can impact potential performance concerns as the list of tenants grows).

In some implementations, when there is a desire to add a data source to the backup/restore service, the following is performed: 1) a plugin is created for that data source and added to the plugin store 116; 2) the plugin is added to the plugin list 156 if it is to be called separately rather than as a dependency by the cron 150; and 3) version IDs are added to the metadata 160 where the data source has multiple versions of data for the tenant.

As discussed above, in some implementations the cron 150, by cycling through the metadata 160, sends a backup request for each combination of domain, tenant, and version ID in the metadata 160. In response, the manager 114 calls, for every combination sent by the cron 150, every plugin according to the plugin list 156. One advantage to having the metadata 160 outside of the backup and restore service 112 is that that metadata may be made more accessible to the writers of the plugins. Alternative implementations may use a different technique (e.g., store one or more, and possibly all, the metadata 160 inside the backup and restore service 112, and the cron 150 could submit the needed request(s)). For instance, some implementations may store all the metadata 160 in the backup and restore service 112, have the cron 150 submit a single request, and have the manager 114 loop through the metadata 160.

Figure 2A:
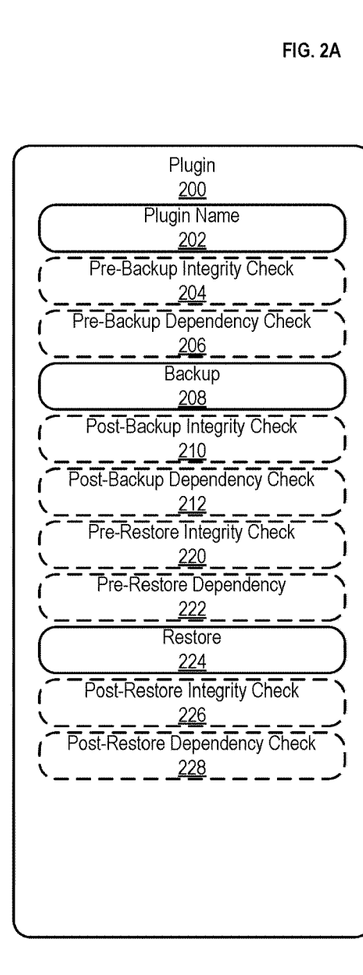
FIG. 2A is a more detailed block diagram illustrating a plugin according to some example implementations.
Figure 2B:
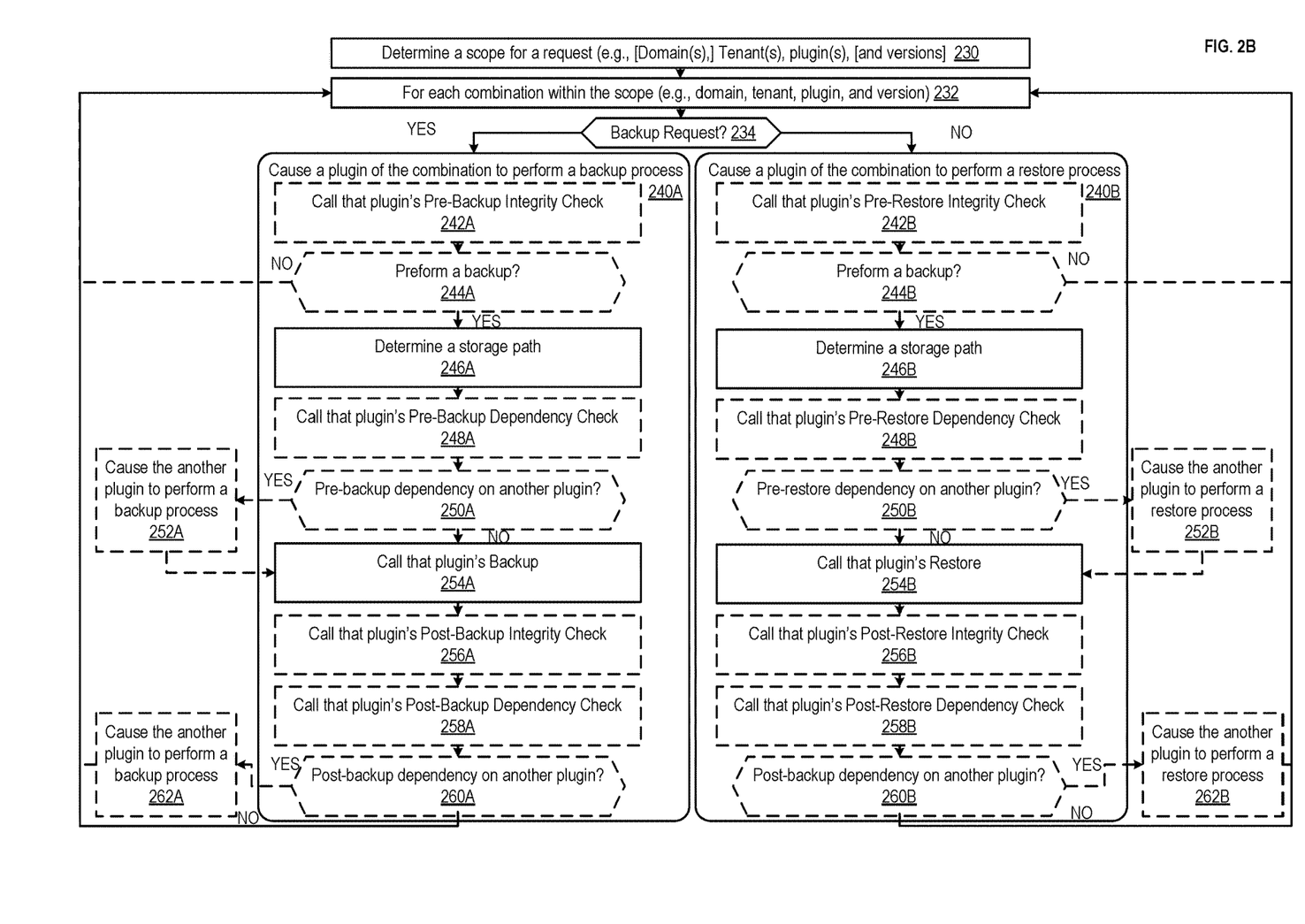
FIG. 2B is a more detailed flow diagram illustrating a dynamic backup and/or restore service according to some example implementations.

FIG. 2A is a more detailed block diagram illustrating a plugin according to some example implementations. FIG. 2B is a more detailed flow diagram illustrating a dynamic backup and/or restore service according to some example implementations. The flow diagram of FIG. 2B will be described with reference to the block diagram of FIG. 2A. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

FIG. 2A illustrates a plugin 200 including a plugin name 202 (also referred to here as a plugin ID or component ID) and code in separately callable parts including: 1) a pre-backup integrity check 204; 2) a pre-backup dependency check 206; 3) a backup 208; 4) a post-backup integrity check 210; 5) a post-backup dependency check 212; 6) a pre-restore integrity check 220; 7) a pre-restore dependency check 222; 8) a restore 224; 9) a post-restore integrity check 226; 10) a post-restore dependency check 228. In some implementations in which the plugins are implemented using an object-oriented programming language, the plugin may be an object (an instance of a class) having a separate method for each of the separately callable parts. In such implementations, the manager 114 may be implemented to call each of these parts according to the flow shown in FIG. 2B.

Thus, FIGS. 2A and 2B illustrate some implementations of an interface between the manager 114 and the plugins 120 that has several advantages. For instance, this has the same advantages described above regarding having a person expected to be the most familiar with task be the writer of the code (the writer of the plugin being familiar with the data source vs the writer of the manager 114 being familiar with the backup and restore service 112). Also, it encourages good programming practices, such as requiring the writer of a given plugin to consider each of the integrity checks and to consider whether any dependency(s) should be processed before or after the actual movement of data. Regarding the latter, this clearly presents consideration of situations where it may be better to perform a backup or a restore on one of the two data sources before the other (e.g., if one of the data sources is large such as a Solr dataset that may be tens or hundreds of gigabytes, it may be preferable to verify that backup or restore of the Solr dataset is successful before a backup or restore of a smaller dataset of synonyms); specifically, having the manager 114 call both puts the choice of before or after in the hands of the writer of the plugin that is expected to be familiar with the respective one of the data sources for that plugin (as compared to the writer of the manager 114).

In some implementations, FIG. 2B is performed, responsive to receipt of a request, by the manager 114 of the backup and restore service 112. Block 230 is like block 130 in that a scope for the request is determined. From block 230, control passes to block 232.

Block 232 represents a loop that goes through each combination within the scope (e.g., each combination of domain (if used), tenant, plugin, and versions (if used)). In the case of a restore request that identifies a domain, tenant, plugin, and version, there may be a single pass through the loop. In contrast, in the case of a back request that identifies a domain, tenant, and versions, the loop may be through each combination domain, tenant, plugin (used by that domain), and version. Those plugins for data sources that do not have versions will ignore the version IDs and do a single backup of the data via blocks 242 and 244. While FIG. 2B illustrates some implementations, the alternative implementations previously described may be used (e.g., see prior discussion regarding FIG. 1C).

In block 234, it is determined if the request is for a backup or a restore. In the context of FIG. 1B, this would be a determination of whether the specific process type is a backup or a restore. In the case of a backup, control passes to block 240A; in the case of a restore, control passes to block 240B. FIG. 2B is separated into an A and a B flow respectively for backup and restore since the two flows are similar. The separation begins at block 240A and 240B and runs through the rest of the flow. The corresponding blocks on the A and B path with the same number perform the same type of operation, but for either a backup or a restore. For example, in block 240A, a plugin of the combination (from block 232) is caused to perform the backup process; similarly, in block 240A, a plugin of the combination is caused to perform the restore process. Control flows from each of blocks 240A and 240B back to block 232. Thus, the blocks of path A will be described and it should be understood that the blocks of path B are the same but for a restore.

Block 240A includes several sub-blocks. In block 242A, a call is made to that plugin's pre-backup integrity check. Regarding FIG. 2A, this would be a call to pre-backup integrity check 204. This integrity check before the backup may include the various example operations previously described. From block 242A, control passes to block 244A.

In block 244A, it is determined whether to perform a backup. As previously described, the call to the integrity check will return an indication of whether the backup can and should proceed. If yes, control passes to block 246A; otherwise, control passes back to block 232.

As shown in block 246A, a storage path is determined, and control passes to block 248A. Block 246A is like block 132. Thus, in some implementations, the manager 114 determines where the data is to be stored in the backup store 122.

In block 248A, a call is made to that plugin's pre-backup dependency check. Regarding FIG. 2A, this would be a call to pre-backup dependency check 206. This dependency check before the backup may include the various example operations previously described. From block 248A, control passes to block 250A.

In block 250A, it is determined whether there is a pre-backup dependency on another plugin. As previously described, the call to the pre-backup dependency check will return an indication of whether and what plugin(s) (using the plugin name or other ID) should be called. If yes, control passes to block 252A; otherwise, control passes back to block 254A.

As shown in block 252A, the plugin on which there is a dependency (the "another plugin" in FIG. 2B) is caused to perform a backup process. In some implementations, this is performed to a recursive operation that performs block 240A with the combination set to the plugin on which there is a dependency. From block 252A, control passes to block 254A.

In block 254A, the backup is called for the plugin. Block 254A is like block 134. Regarding FIG. 2A, this would be a call to backup 208 which causes the data to be copied (see above discussion regarding various alternatives for causing the movement of the data). From block 254A, control passes to block 256A.

In block 256A, a call is made to that plugin's post-backup integrity check. Regarding FIG. 2A, this would be a call to post-backup integrity check 210. This integrity check after the backup may include the various example operations previously described. FIG. 2B shows that control passes from block 256A to 258A. In some implementations in which the backup is undo if the post-backup dependency check is not passed (see above), the flow would divert to other operations rather than continuing to block 258A.

In block 258A, a call is made to that plugin's post-backup dependency check. Regarding FIG. 2A, this would be a call to post-backup dependency check 212. This dependency check before the backup may include the various example operations previously described. From block 258A, control passes to block 260A.

In block 260A, it is determined whether there is a post-backup dependency on another plugin. As previously described, the call to the post-backup dependency check will return an indication of whether and what plugin(s) (using the plugin name or other ID) should be called. If yes, control passes to block 262A; otherwise, control passes back to block 232.

As shown in block 262A, the plugin on which there is a dependency (the "another plugin" in FIG. 2B) is caused to perform a backup process. In some implementations, this is performed as a recursive operation that performs block 240A with the combination set to the plugin on which there is a dependency. From block 262A, control passes back to block 232A.

Micro-Services and Micro-Services Architecture

The term "micro-services architecture" refers to an architecture comprised of micro-services in which each of the micro-services does just one thing efficiently and interacts with others of the micro-services as needed. This contrasts with monolithic architectures in which complex software is run on a single, powerful server. Each of the micro-services may use a different type of hardware (e.g., machine configurations that include specific numbers of processors, types of processors (e.g., CPUs, GPUs, accelerators), types of memories (e.g., DDR DRAM, HBM (High Bandwidth Memory), etc.), and/or I/O characteristics) and/or software to respectively perform a type of processing different from the types of processing performed by the other micro-services. The micro-services architecture allows an application to be decomposed into different ones of these micro-services, improving modularity and making the program code easier to understand, design and test. For example, individual micro-services may be modified (e.g., upgraded, swapped out) without affecting the operation of other micro-services used by the application (i.e., typically, each micro-service is independently deployable). Thus, a "micro-services architecture" may be a loosely coupled arrangement of such micro-services over a network, where each micro-service performs its particular type of processing within the context of a larger, overarching operation (the application), and communicates with other micro-services.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 3A:
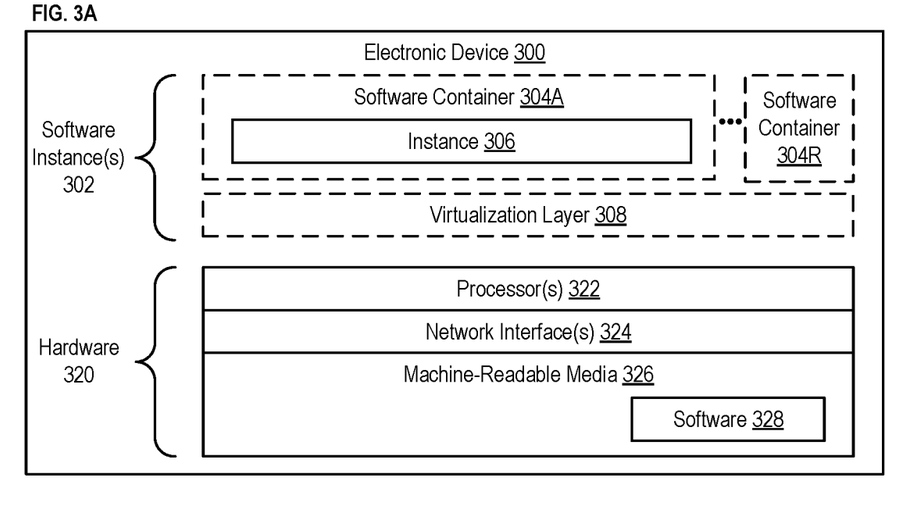
FIG. 3A is a block diagram illustrating an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients, the backup/restore service 112, and the cron 150 may be implemented in one or more electronic devices 300. In one implementation: 1) each of the clients is implemented in a separate one of the electronic devices 300 (e.g., in end user devices where the software 328 represents the software to implement clients to interface directly and/or indirectly with the backup/restore service 112 (e.g., software 328 represents a web browser, a native client, a portal, a command-line interface, and/or an application programming interface (API) based upon protocols such as Simple Object Access Protocol (SOAP), Representational State Transfer (REST), etc.)); 2) the backup/restore service 112 is implemented in a separate set of one or more of the electronic devices 300 (e.g., a set of one or more server devices where the software 328 represents the software to implement the backup/restore service 112); and 3) in operation, the electronic devices implementing the clients and the backup/restore service 112 would be communicatively coupled (e.g., by a network) and would establish between them (or through one or more other layers and/or or other services) connections for implementing the manager 114 and the plugins 120. Other configurations of electronic devices may be used in other implementations (e.g., an implementation in which the client and the backup/restore service 112 are implemented on a single one of electronic device 300).

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine (such as Docker Engine by Docker, Inc. or rkt in Container Linux by Red Hat, Inc.) running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

Example Environment

Figure 3B:
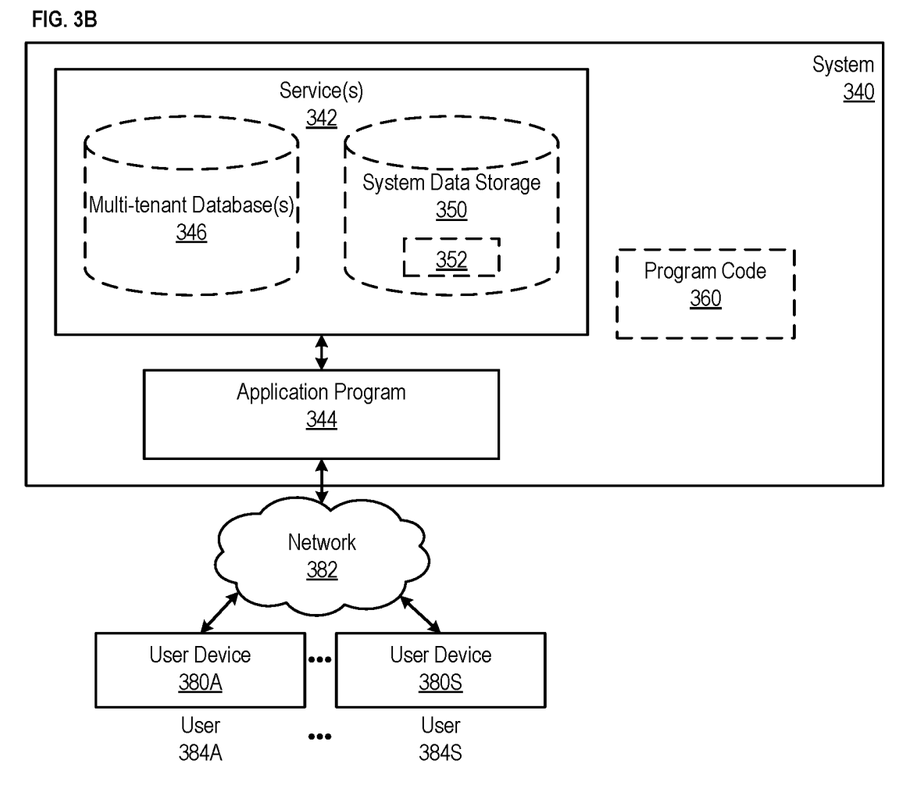
FIG. 3B is a block diagram of a deployment environment according to some example implementations.

FIG. 3B is a block diagram of a deployment environment according to some example implementations. A system 340 includes hardware (e.g., a set of one or more server devices) and software to provide service(s) 342, including the backup/restore service 112. In some implementations the system 340 is in one or more datacenter(s). These datacenter(s) may be: 1) first party datacenter(s), which are datacenter(s) owned and/or operated by the same entity that provides and/or operates some or all the software that provides the service(s) 342; and/or 2) third-party datacenter(s), which are datacenter(s) owned and/or operated by one or more different entities than the entity that provides the service(s) 342 (e.g., the different entities may host some or all the software provided and/or operated by the entity that provides the service(s) 342). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all the vendors' data. As another example, in the context of Platform as a Service (PAAS), one set of tenants may be third-party application developers providing applications/services and another set of tenants may be customers of different ones or all the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following types of services: backup/restore service 112; Customer relationship management (CRM); Configure, price, quote (CPQ); Business process modeling (BPM); Customer support; Marketing; External data connectivity; Productivity; Database-as-a-Service; Data-as-a-Service (DAAS or DaaS);

Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). Each of the above cloud services may be connected to the backup/restore service 112 via the plugin architecture as previously described. In other words, one or more of the data sources used to implement each of the cloud services may be added to the backup/restore service 112 as previously described.

For example, system 340 may include an application platform 344 that enables PAAS for creating, managing, and executing one or more applications developed by the provider of the application platform 344, users accessing the system 340 via one or more of user devices 380A-380S, or third-party application developers accessing the system 340 via one or more of user devices 380A-380S.

In some implementations, one or more of the service(s) 342 may use one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user devices 380A-380S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the multi-tenant database(s) 346 and/or system data storage 350. The multi-tenant database(s) 346, for example, may be one of the data sources added to the backup/restore service 112.

In some implementations, the service(s) 342 are implemented using virtual applications dynamically created at run time responsive to queries from the user devices 380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long-Term Evolution (LTE) standard, LTE Advanced, LTE Advanced Pro), a fifth-generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages, and applications available to it from system 340 over network 382.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases do not necessarily refer to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A non-transitory machine-readable storage medium that provides instructions that, if executed by a set of one or more processors, are configurable to cause the set of one or more processors to provide a service that is to backup and/or restore data with a backup store by performing operations comprising:

determining, based at least in part on a request, a scope that includes at least a specific tenant of a plurality of tenants and a specific component, wherein the service is extensible through implementation and addition of different components to manages different data sources used by different services that contribute to a set of one or more multi-tenant cloud services, wherein each of the components, including the specific component, is for a respective one of the data sources;

determining, for the specific component, a set of one or more parameters usable to identify the specific tenant and a specific storage path particular to a combination including the specific tenant and the respective one of the data sources, wherein each of the components, responsive to being called to perform a specific process type with a current set of parameters usable to identify one of the plurality of tenants as a currently identified tenant and a currently identified storage path, is to be implemented to cause data, which belongs to the currently identified tenant, to be copied between the respective one of the data sources and the backup store according to the currently identified storage path; and calling the specific component to perform a specific process type with the set of one or more parameters usable to identify the specific tenant and the specific storage path respectively as the currently identified tenant and the currently identified storage path, wherein the specific process type is one of backup and restore.

2. The machine-readable storage medium of claim 1, the operations further comprising:

calling the specific component to perform a dependency check; and when the specific component responds to the dependency check representing that the respective one of the data sources is dependent on another respective one of the data sources, performing the following:

determining, for a second specific component that is for the another respective one of the data sources, a second set of one or more parameters usable to identify the specific tenant and a second specific storage path particular to a combination including the specific tenant and the another respective one of the data sources; and calling the second specific component to perform the specific process type with the second set of one or more parameters usable to identify the specific tenant and the second specific storage path respectively as the currently identified tenant and the currently identified storage path.

3. The machine-readable storage medium of claim 1, wherein the scope also includes a specific domain of a plurality of domains, wherein each of the plurality of domains hosts a respective one of the set of one or more multi-tenant cloud services, hosts the one or more of the services that contribute to the respective one of the set of one or more multi-tenant cloud services, and hosts the one or more of the data sources used by the one or more of the services that contribute to the respective one of the set of one or more multi-tenant cloud services, and wherein the combination also includes the specific domain.

4. The machine-readable storage medium of claim 1, wherein the respective one of the data sources for the specific component is to store a plurality of versions of the data for the specific tenant, wherein the scope also includes a specific version of the plurality of versions, and wherein the combination also includes the specific version.

5. The machine-readable storage medium of claim 1, wherein a second of the components is for a second respective one of the data sources, wherein the specific component and the second component are for respective ones of the data sources that are used by a single one of the services that contribute to the set of one or more multi-tenant cloud services.

6. The machine-readable storage medium of claim 1, the operations further comprising:
 determining, for the specific component, a second set of parameters usable to identify a second specific tenant and a second specific storage path particular to a second combination including the second specific tenant and the respective one of the data sources; and
 calling the specific component to perform the specific process type with the second set of one or more parameters that are usable to identify the second specific tenant and the second specific storage path respectively as the currently identified tenant and the currently identified storage path.

7. The machine-readable storage medium of claim 1, wherein the specific component is to be implemented to access the data, which belongs to the currently identified tenant, to be copied between the respective one of the data sources and the backup store according to the currently identified storage path.

8. The machine-readable storage medium of claim 1, wherein the specific component is to be implemented to cause an internal backup and restore service of the respective one of the data sources to copy the data, which belongs to the currently identified tenant, between the respective one of the data sources and the backup store according to the currently identified storage path.

9. The machine-readable storage medium of claim 8, the operations further comprising:
 calling the specific component to perform a dependency check; and
 when the specific component responds to the dependency check representing that the respective one of the data sources is dependent on another respective one of the data sources, performing the following:
  determining, for a second specific component that is for the another respective one of the data sources, a second set of one or more parameters usable to identify the specific tenant and a second specific storage path particular to a combination including the specific tenant and the respective another one of the data source; and
  calling the second specific component to perform the specific process type with the second set of one or more parameters usable to identify the specific tenant and the second specific storage path respectively as the currently identified tenant and the currently identified storage path, wherein the second specific component is to be implemented to access the data, which belongs to the currently identified tenant, to be copied between the another respective one of the data sources and the backup store according to the currently identified storage path.

10. The machine-readable storage medium of claim 1, the operations further comprising:
 calling the specific component to perform an integrity check with the set of one or more parameters before the calling to perform the specific process type; and
 calling the specific component to perform an integrity check with the set of one or more parameters after the calling to perform the specific process type.

11. The machine-readable storage medium of claim 10, the operations further comprising:
 calling the specific component to perform a dependency check with the set of one or more parameters before the calling to perform the specific process type; and
 calling the specific component to perform a dependency check with the set of one or more parameters after the calling to perform the specific process type.

12. A method for providing a service that is to backup and/or restore data with a backup store, the method comprising:
 responsive to receipt of a request, a manager of the service being executed by an electronic device performing the following:
  determining, based at least in part on the request, a scope that includes at least a specific tenant of a plurality of tenants and a specific component, wherein the service is extensible through implementation and addition of different components to manages different data sources used by different services that contribute to a set of one or more multi-tenant cloud services, wherein each of the components, including the specific component, is for a respective one of the data sources;
  determining, for the specific component, a set of one or more parameters usable to identify the specific tenant and a specific storage path particular to a combination including the specific tenant and the respective one of the data sources, wherein each of the components, responsive to being called to perform a specific process type with a current set of parameters usable to identify one of the plurality of tenants as a currently identified tenant and a currently identified storage path, is to be implemented to cause data, which belongs to the currently identified tenant, to be copied between the respective one of the data sources and the backup store according to the currently identified storage path; and
  calling the specific component to perform a specific process type with the set of one or more parameters usable to identify the specific tenant and the specific storage path respectively as the currently identified tenant and the currently identified storage path, wherein the specific process type is one of backup and restore.

13. The method of claim 12, wherein the manager additionally performs the following:
 calling the specific component to perform a dependency check; and when the specific component responds to the dependency check representing that the respective one of the data sources is dependent on another respective one of the data sources, performing the following:
- determining, for a second specific component that is for the another respective one of the data sources, a second set of one or more parameters usable to identify the specific tenant and a second specific storage path particular to a combination including the specific tenant and the another respective one of the data sources; and
- calling the second specific component to perform the specific process type with the second set of one or more parameters usable to identify the specific tenant and the second specific storage path respectively as the currently identified tenant and the currently identified storage path.

14. The method of claim 12, wherein the scope also includes a specific domain of a plurality of domains, wherein each of the plurality of domains hosts a respective one of the set of one or more multi-tenant cloud services, hosts the one or more of the services that contribute to the respective one of the set of one or more multi-tenant cloud services, and hosts the one or more of the data sources used by the one or more of the services that contribute to the respective one of the set of one or more multi-tenant cloud services, and wherein the combination also includes the specific domain.

15. The method of claim 12, wherein the respective one of the data sources for the specific component is to store a plurality of versions of the data for the specific tenant, wherein the scope also includes a specific version of the plurality of versions, and wherein the combination also includes the specific version.

16. The method of claim 12, wherein a second of the components is for a second respective one of the data sources, wherein the specific component and the second component are for respective ones of the data sources that are used by a single one of the services that contribute to the set of one or more multi-tenant cloud services.

17. The method of claim 12, wherein the manager additionally performs the following:
- determining, for the specific component, a second set of parameters usable to identify a second specific tenant and a second specific storage path particular to a second combination including the second specific tenant and the respective one of the data sources; and
- calling the specific component to perform the specific process type with the second set of one or more parameters that are usable to identify the second specific tenant and the second specific storage path respectively as the currently identified tenant and the currently identified storage path.

18. The method of claim 12, wherein the specific component is to be implemented to access the data, which belongs to the currently identified tenant, to be copied between the respective one of the data sources and the backup store according to the currently identified storage path.

19. The method of claim 12, wherein the specific component is to be implemented to cause an internal backup and restore service of the respective one of the data sources to copy the data, which belongs to the currently identified tenant, between the respective one of the data sources and the backup store according to the currently identified storage path.

20. The method of claim 19, wherein the manager additionally performs the following:
- calling the specific component to perform a dependency check; and
- when the specific component responds to the dependency check representing that the respective one of the data sources is dependent on another respective one of the data sources, performing the following:
  - determining, for a second specific component that is for the another respective one of the data sources, a second set of one or more parameters usable to identify the specific tenant and a second specific storage path particular to a combination including the specific tenant and the respective another one of the data source; and
  - calling the second specific component to perform the specific process type with the second set of one or more parameters usable to identify the specific tenant and the second specific storage path respectively as the currently identified tenant and the currently identified storage path, wherein the second specific component is to be implemented to access the data, which belongs to the currently identified tenant, to be copied between the another respective one of the data sources and the backup store according to the currently identified storage path.

21. The method of claim 12, wherein the manager additionally performs the following:
- calling the specific component to perform an integrity check with the set of one or more parameters before the calling to perform the specific process type; and
- calling the specific component to perform an integrity check with the set of one or more parameters after the calling to perform the specific process type.

22. The method of claim 21, wherein the manager additionally performs the following:
- calling the specific component to perform a dependency check with the set of one or more parameters before the calling to perform the specific process type; and
- calling the specific component to perform a dependency check with the set of one or more parameters after the calling to perform the specific process type.

23. An apparatus comprising:
- a set of one or more processors;
- a non-transitory machine-readable storage medium that provides instructions that, if executed by the set of one or more processors, are configurable to cause the apparatus to provide a service that is to backup and/or restore data with a backup store by performing operations comprising:
  - determining, based at least in part on a request, a scope that includes at least a specific tenant of a plurality of tenants and a specific component, wherein the service is extensible through implementation and addition of different components to manages different data sources used by different services that contribute to a set of one or more multi-tenant cloud services, wherein each of the components, including the specific component, is for a respective one of the data sources;
  - determining, for the specific component, a set of one or more parameters usable to identify the specific tenant and a specific storage path particular to a combination including the specific tenant and the respective one of the data sources, wherein each of the components, responsive to being called to perform a specific process type with a current set of parameters usable to identify one of the plurality of tenants as a currently identified tenant and a currently identified storage path, is to be implemented to cause data, which belongs to the currently identified tenant, to be copied between the respective one of the data sources and the backup store according to the currently identified storage path; and calling the specific component to perform a specific process type with the set of one or more parameters usable to identify the specific tenant and the specific storage path respectively as the currently identified tenant and the currently identified storage path, wherein the specific process type is one of backup and restore.

24. The apparatus of claim 23, the operations further comprising:

calling the specific component to perform a dependency check; and when the specific component responds to the dependency check representing that the respective one of the data sources is dependent on another respective one of the data sources, performing the following:

determining, for a second specific component that is for the another respective one of the data sources, a second set of one or more parameters usable to identify the specific tenant and a second specific storage path particular to a combination including the specific tenant and the another respective one of the data sources; and calling the second specific component to perform the specific process type with the second set of one or more parameters usable to identify the specific tenant and the second specific storage path respectively as the currently identified tenant and the currently identified storage path.

25. The apparatus of claim 23, wherein the scope also includes a specific domain of a plurality of domains, wherein each of the plurality of domains hosts a respective one of the set of one or more multi-tenant cloud services, hosts the one or more of the services that contribute to the respective one of the set of one or more multi-tenant cloud services, and hosts the one or more of the data sources used by the one or more of the services that contribute to the respective one of the set of one or more multi-tenant cloud services, and wherein the combination also includes the specific domain.

26. The apparatus of claim 23, wherein the respective one of the data sources for the specific component is to store a plurality of versions of the data for the specific tenant, wherein the scope also includes a specific version of the plurality of versions, and wherein the combination also includes the specific version.

27. The apparatus of claim 23, wherein a second of the components is for a second respective one of the data sources, wherein the specific component and the second component are for respective ones of the data sources that are used by a single one of the services that contribute to the set of one or more multi-tenant cloud services.

28. The apparatus of claim 23, the operations further comprising:

determining, for the specific component, a second set of parameters usable to identify a second specific tenant and a second specific storage path particular to a second combination including the second specific tenant and the respective one of the data sources; and calling the specific component to perform the specific process type with the second set of one or more parameters that are usable to identify the second specific tenant and the second specific storage path respectively as the currently identified tenant and the currently identified storage path.

29. The apparatus of claim 23, wherein the specific component is to be implemented to access the data, which belongs to the currently identified tenant, to be copied between the respective one of the data sources and the backup store according to the currently identified storage path.

30. The apparatus of claim 23, wherein the specific component is to be implemented to cause an internal backup and restore service of the respective one of the data sources to copy the data, which belongs to the currently identified tenant, between the respective one of the data sources and the backup store according to the currently identified storage path.

* * * * *